United States Patent [19]
Fujioka et al.

[11] Patent Number: 5,212,373
[45] Date of Patent: May 18, 1993

[54] NON-CONTACT IC CARD

[75] Inventors: Shuzo Fujioka; Toshiyuki Matsubara; Shigeru Furuta, all of Itami, Japan

[73] Assignee: Mitsubishi Denki Kabushiki Kaisha, Tokyo, Japan

[21] Appl. No.: 606,854

[22] Filed: Oct. 31, 1990

[30] Foreign Application Priority Data

Jul. 3, 1990 [JP] Japan .................................. 2-178003

[51] Int. Cl.$^5$ ......................................... G06K 19/06
[52] U.S. Cl. ................................... 235/492; 235/380; 235/437
[58] Field of Search ...................... 235/380, 492, 437; 902/26; 364/408

[56] References Cited

U.S. PATENT DOCUMENTS

| | | | |
|---|---|---|---|
| 5,036,461 | 7/1991 | Elliott et al. .......................... | 235/380 |
| 5,068,521 | 11/1991 | Yamaguchi ........................... | 235/380 |
| 5,070,233 | 12/1991 | Takizawa .............................. | 235/380 |
| 5,101,410 | 3/1992 | Niimura et al. ....................... | 235/380 |
| 5,105,074 | 4/1992 | Nara ..................................... | 235/380 |

FOREIGN PATENT DOCUMENTS

| | | |
|---|---|---|
| 2596897 | 4/1987 | France . |
| 2615984 | 5/1988 | France . |
| 62-34292 | 2/1987 | Japan . |
| 1-206422 | 8/1989 | Japan . |

*Primary Examiner*—Harold Pitts
*Attorney, Agent, or Firm*—Leydig, Voit & Mayer

[57] ABSTRACT

In a non-contact IC card, when the card is in a standby mode of operation a CPU provides a command to inhibit the application of a clock signal to digital circuitry including the CPU and/or to inhibit the application of an operating voltage to analog circuitry, except for an antenna circuit and a trigger signal demodulating circuit, so that power consumption in the standby mode is reduced. For transfer of data between the IC card and an external device, a trigger signal derived by demodulating received data in the trigger signal demodulating circuit is used to apply the clock signal to said digital circuitry and the operating voltage to all of the analog circuitry.

6 Claims, 4 Drawing Sheets

NON-CONTACT IC CARD

This invention relates to a non-contact IC card with no contact terminals and more particularly to a non-contact IC card which consumes little power when transfer of data between the IC card and an external device is not occurring.

BACKGROUND OF THE INVENTION

FIG. 1 schematically shows an internal structure of a conventional non-contact IC card. In FIG. 1, an oscillator circuit 1 generates a clocking oscillation signal 2 which is applied to a CPU 31 in a digital circuit 3. The digital circuit 3 includes, in addition to the CPU 31, a program storage ROM 32, a data storage RAM 33, and an input/output control circuit 34 for transferring to and receiving data from a modulator/demodulator circuit 41 in an analog circuit 4. The CPU 31, the ROM 32, the RAM 33, and the input/output control circuit 34 are coupled to each other by a bus 5. An antenna circuit 42 is provided in the analog circuit 4 for converting an electrical signal from the modulator/demodulator circuit 41 into a radio wave 91 for transmitting data to an external device. The antenna circuit 42 also receives data in the form of a radio wave 92 from the external device. An internal power supply battery 6 continuously supplies operating current to the oscillator circuit 1, the digital circuit 3 and the analog circuit 4 via lines 51, 52, and 53.

Now, the operation of the conventional non-contact IC card of FIG. 1 is described.

Operating current is continuously supplied from the battery 6 to the oscillator circuit 1, the digital circuit 3, and the analog circuit 4. External data to be applied to the non-contact IC card 10 is received in the form of a radio wave 92 by the antenna circuit 42. The antenna circuit 42 converts the received wave into an electrical signal $S_E$ and applies it to the modulator/demodulator circuit 41. The modulator/demodulator circuit 41 demodulates the signal $S_E$ into a digital data signal $S_D$, which is applied to the input/output control circuit 34. An output data signal from the input/output control circuit 34 is applied via the bus 5 to the CPU 31, which reads the output data signal applied to it for causing a required operation to be executed.

For transmission of data from the non-contact IC card 10 to the external device, a data signal from the CPU 31 is fed via the bus 5 to the input/output control circuit 34, which, in response to the received data signal, applies a digital data signal $S_D'$ to the modulator/demodulator circuit 41. The modulator/demodulator circuit 41 modulates a carrier with the digital data signal $S_D'$ to produce a modulated electrical signal $S_E'$ and sends it to the antenna circuit 42. The antenna circuit 42 converts the modulated signal received from the modulator/demodulator circuit 42 into a radio wave 91 for transmission to the external device. Thus, through the transmission of the wave 91 and the reception of the wave 92, the non-contact IC card 10 can transmit data to and receive data from the external device.

With the above-described arrangement of the conventional non-contact IC card 10, current is continuously supplied from the battery to all of the circuits including the oscillator circuit 1, the digital circuit 3 and the analog circuit 4, even in the standby mode of operation during which the antenna circuit 42 is neither transmitting the wave 91 nor receiving the wave 92, and, therefore, a large amount of power from the battery 6 is consumed, which disadvantageously causes the life of the battery 6 to be short.

Japanese Published Patent Application No. HEI 1-206422 discloses a "portable information device" in which power consumption in a standby mode is reduced. In this portable information device, an operating voltage applied to each circuit is decreased in the standby mode, and the operating voltage to the respective circuits is raised to its nominal value for the normal mode of operation of the device. In this portable information device, however, the application of the operating voltage is not controlled by an external signal, and, even in the standby mode of operation, an operating voltage, although it is low, is supplied to the circuits. Thus, reduction of the power consumption is not sufficient.

Japanese Published Patent Application No. SHO 63-58524 discloses an IC card in which in a standby mode, first clock generating means is operated to generate a lower frequency clock signal, and in response to a key input or to an external signal input, second clock generating means is enabled to generate a nominally higher frequency clock. Thus, the power consumption in the standby operation mode is reduced. In this IC card, too, because a clock signal, though it is at a lower frequency, is generated in the standby mode, the reduction of power consumption as a whole is not sufficient. Furthermore, in this IC card, even in the standby mode, an operating voltage is continuously supplied to an analog circuit in the IC card, which causes a large amount of power to be consumed from an internal battery.

Japanese Published Patent Application No. SHO 62-34292 shows an IC card which comprises an internal switch circuit. The internal switch circuit is turned on in response to an optical signal applied thereto from an external read-out device to cause an operating voltage to be applied from an internal battery to internal circuits, such as a control unit and a memory unit, within the card. Reduction of power consumption in a standby mode may be achieved in this IC card, but, in case the external device operates abnormally, the IC card may respond to the reception of an optical signal from the external device so that the internal battery continues to supply the operating voltage to the respective internal circuits, and, thus, power is wasted.

According to the present invention, a non-contact IC card is provided, in which, not only when the IC card is in the standby mode of operation during which data transfer between the IC card and the external device is not occurring, but also when the external device is in abnormal operation so that data transfer is abnormal or data itself is abnormal, the operation of various units of the IC card is inhibited to thereby reduce power consumption.

SUMMARY OF THE INVENTION

According to the present invention, a non-contact IC card comprises a clock oscillator circuit, digital circuitry including, a CPU, an ROM and an RAM, and analog circuitry including an antenna circuit through which data is transferred between the IC card and an external device, a data modulator/demodulator circuit and a trigger signal demodulating circuit. In a standby mode of operation the CPU provides a command to inhibit a clock signal from being applied to circuits in the digital circuitry and/or to inhibit an operating voltage from being applied to part of the analog circuitry, to thereby reduce power consumption. When it becomes necessary to transfer data to and from the external device, received data is demodulated in the trigger signal demodulating circuit to produce a trigger signal which triggers the application of the clock signal to given circuits in the digital circuitry and also the resumption of the application of the operating voltage to the entire analog circuitry.

For data transfer between the non-contact IC card according to the present invention and the external device, the internal clock is enabled in the CPU and, at the same time, an operating voltage is supplied to the entire analog circuitry. In the standby operation mode, in response to a command given by the CPU, the clock is disabled in the CPU, and/or the application of an operating voltage to the analog circuitry, except for the circuits necessary for generating a trigger signal, i.e. the antenna circuit and the trigger signal demodulating circuit, is inhibited, whereby power consumed during the operation in the standby mode is reduced.

DESCRIPTION OF PREFERRED EMBODIMENT

A non-contact IC card according to the present invention is described with reference to FIGS. 2-4.

Figure 1:
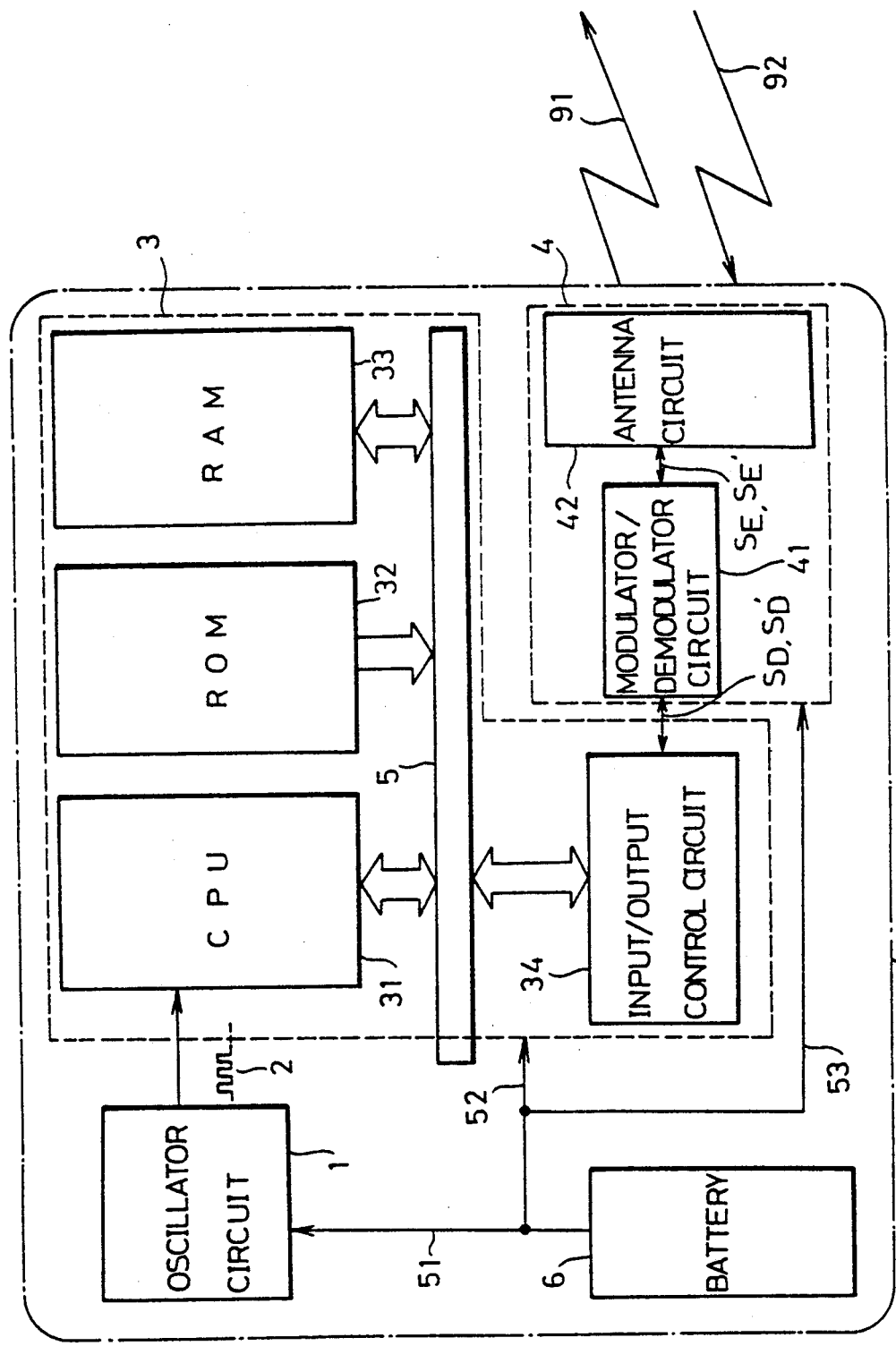
FIG. 1 schematically shows the entire structure of a conventional non-contact IC card.
Figure 2:
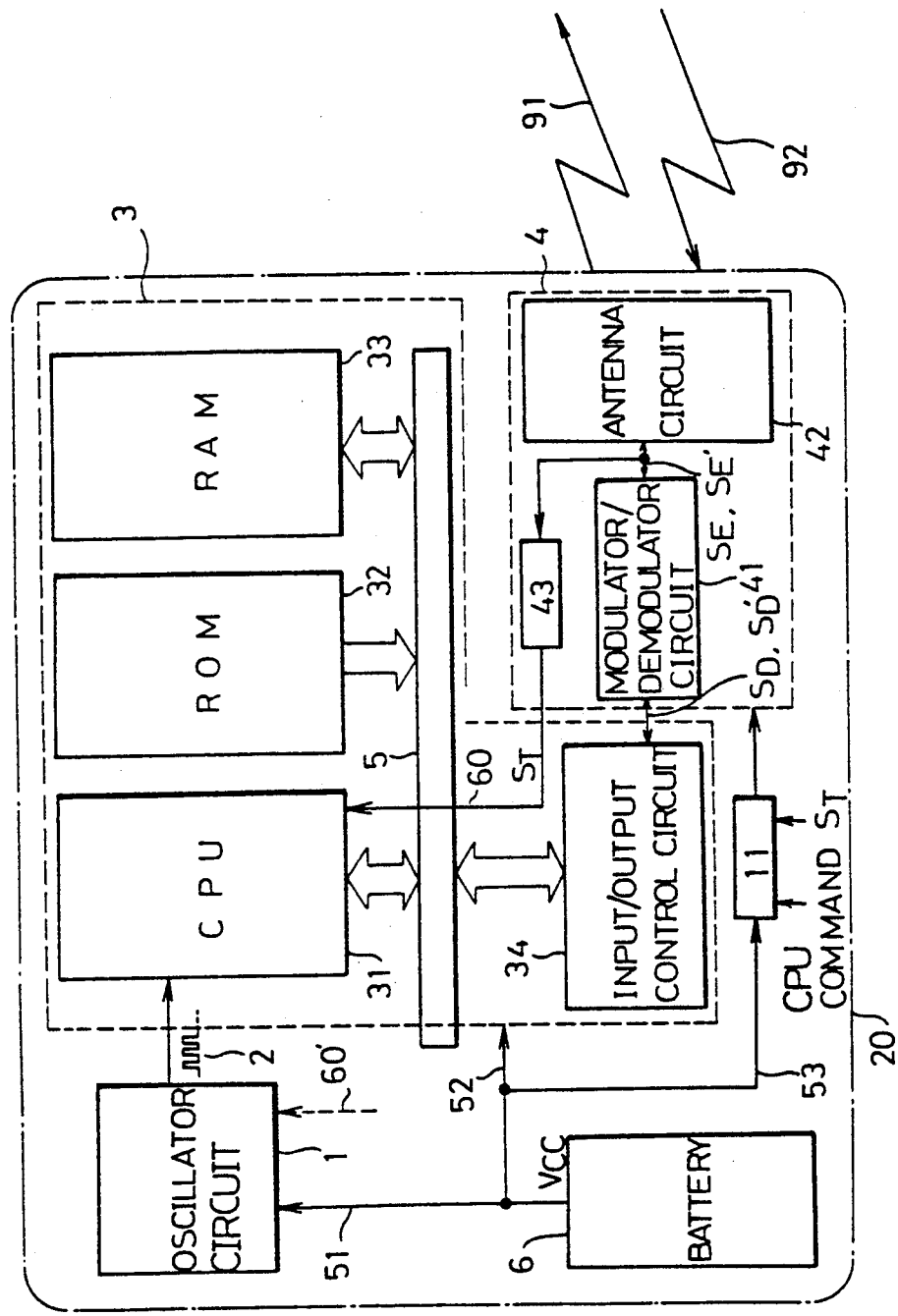
FIG. 2 schematically shows the entire structure of a non-contact IC card according to the present invention.

In FIG. 2, a non-contact IC card 20 according to the present invention is shown. An oscillator circuit 1 generates a clocking oscillation signal 2. The oscillation signal 2 is supplied to a CPU 1 in digital circuitry 3. The CPU 1 is coupled to a bus 5 to which a ROM 32 for storing programs, a RAM 33 for storing data, and an input/output control circuit 34 are coupled. Analog circuitry 4 comprises an antenna circuit 42 through which data is transmitted to and received from an external device in the form of radio waves 91 and 92, a modulator/demodulator circuit 41 which sends to or receives from the antenna circuit 42 an electrical signal $S_E$ or $S_E'$, and a trigger signal demodulating circuit 43 which receives the electrical signal $S_E$ generated by the antenna circuit 42 in response to the received wave 92 and generates a trigger signal $S_T$. The trigger signal $S_T$ is applied to the CPU 31 for controlling an internal clock inhibit circuit in the CPU 31, which will be described later, and also a switching circuit 11 in a power supply line 53 by which an operating voltage is supplied from a battery 6 to the analog circuitry 4. The battery 6 provides an operating voltage to the oscillator circuit through a line 51, to the digital circuitry 3 through a line 52 and to the analog circuitry 4 through the line 53 and the switching circuit 11.

Figure 3:
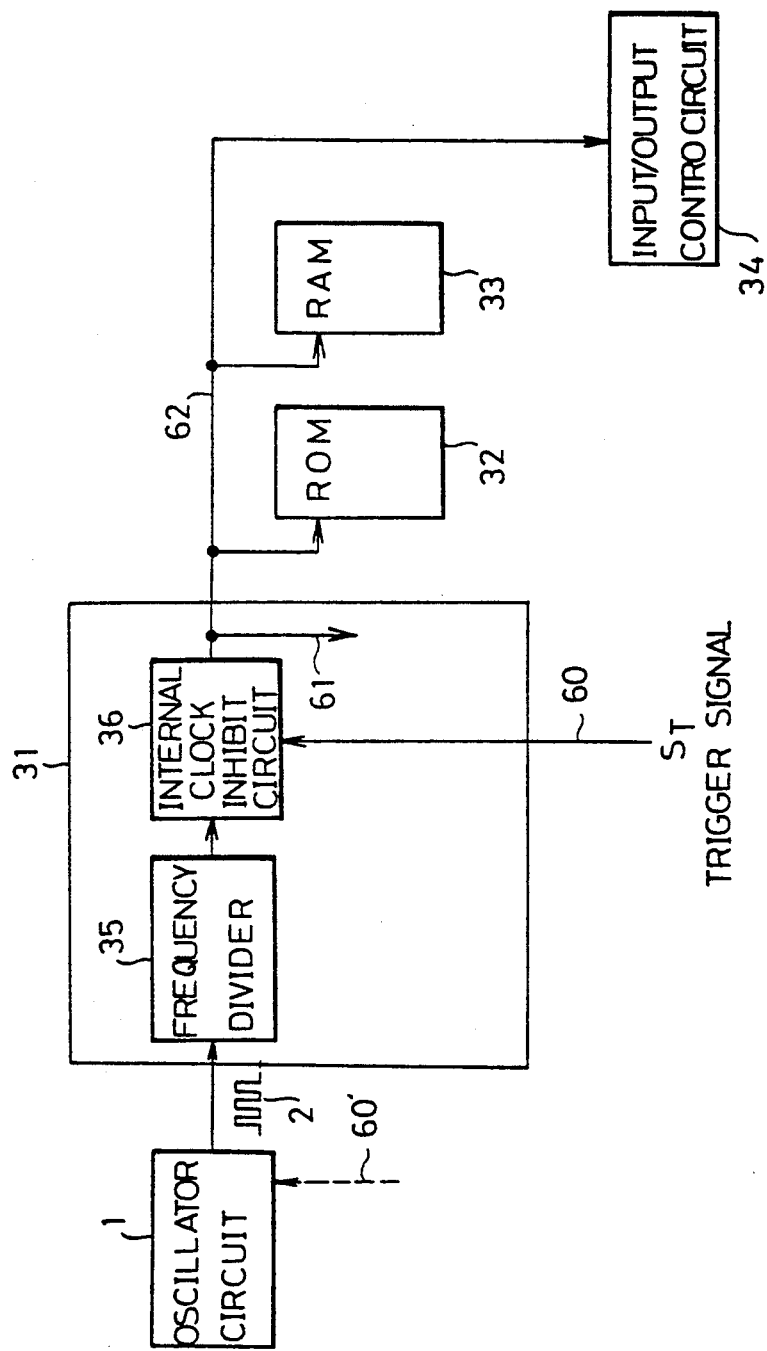
FIG. 3 shows the connection between an oscillator circuit and a clock circuit in digital circuitry of the non-contact IC Card of FIG. 2 to which the present invention relates.
Figure 4:
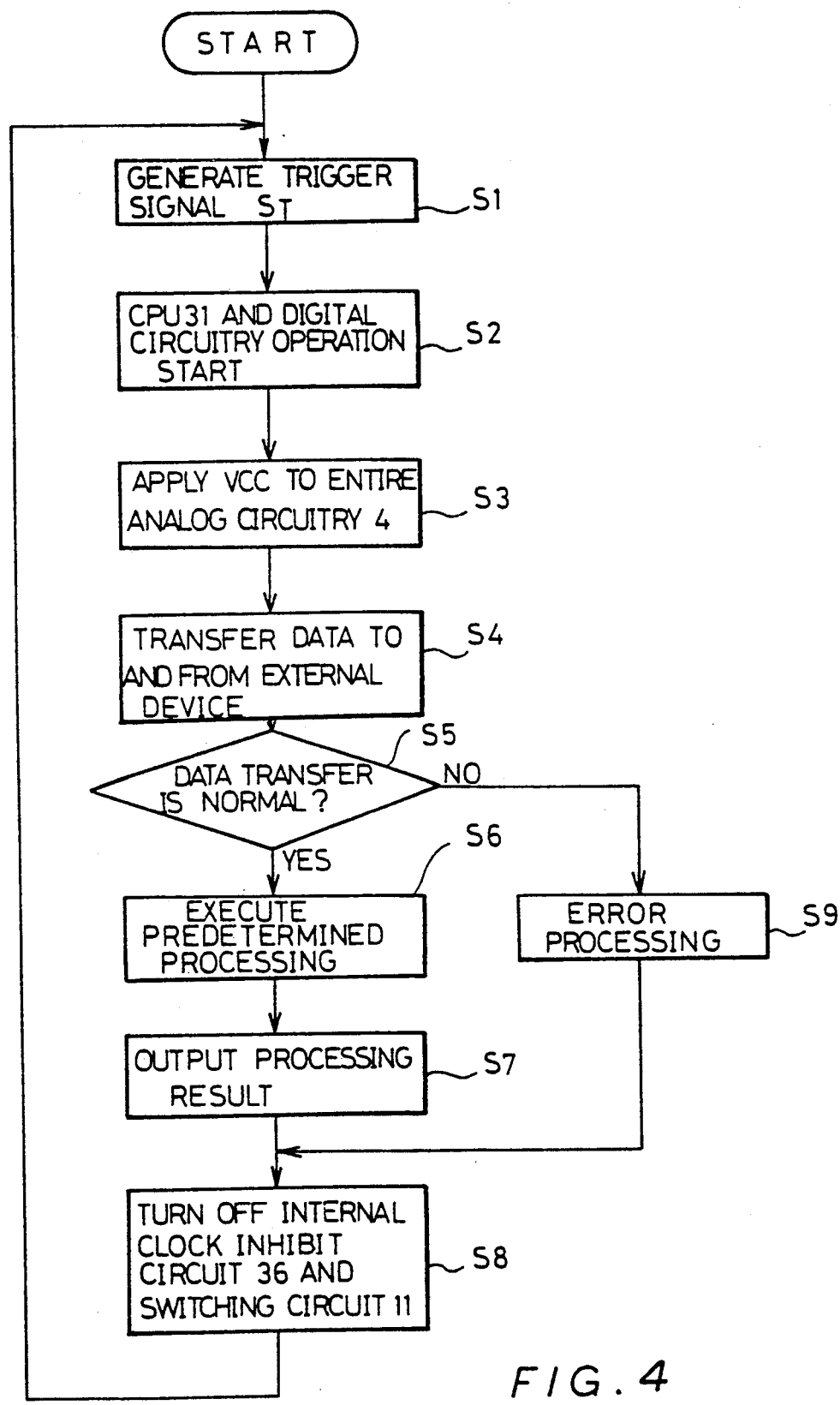
FIG. 4 is a flow chart for use in explaining the operation of the non-contact IC card of FIG. 2.

FIG. 3 is a schematic diagram showing the CPU 31, the ROM 32, the RAM 33 and the input/output control circuit 34 in the digital circuitry 3, and parts associated with them. In FIG. 3, the clocking oscillation signal 2 from the oscillator circuit 1 is applied to a frequency divider circuit 35 in the CPU 31, where it is appropriately frequency-divided and applied to the internal clock inhibit circuit 36.

In the standby mode of operation, the internal clock inhibit circuit 36 responds to a command from the CPU 31 by inhibiting the internal clock signal being applied to internal circuits of the CPU 31, the ROM 32, the RAM 33 and the input/output control circuit 34. In the standby mode, the switching circuit 11 in the line 53 through which an operating voltage $V_{cc}$ is applied to the analog circuitry 4 from the battery 6 is turned off also in response to a command from the CPU 31 so that the application of the operating voltage $V_{cc}$ to the analog circuitry 4 is inhibited. It should be noted, however, that an operating voltage is continuously applied to that circuit portion of the analog circuitry 4 which receives the wave 92 and generates the trigger signal $S_T$, such as the antenna circuit 42 and the trigger signal demodulating circuit 43.

Now, the operation of the non-contact IC card of the present invention is described with reference to the flow chart of FIG. 4.

When the IC card 20 in the standby mode receives a wave 92 and the antenna circuit 42 generates an electrical signal $S_E$, the trigger signal demodulating circuit 43 demodulates the electrical signal $S_E$ to generate a trigger signal $S_T$ (Step S1).

The trigger signal $S_T$ is applied to the internal clock inhibit circuit 36 through a trigger line 60 to turn on the circuit 36 to permit the clock signal to be provided to the various internal circuits of the CPU 31 through a clock line 61, whereby the operation of the CPU 31 is initiated. At the same time, the clock signal is also applied through a clock line 62 to the ROM 32, RAM 33 and the input/output control circuit 34. Thus, the digital circuitry 3 is placed in the operating state (Step S2).

The trigger signal $S_T$ is applied also to the switching circuit 11 directly (as indicated by an arrow with a notation "$S_T$" attached to it in FIG. 2) or via the CPU 31 to turn on the switching circuit 11 so that an operating voltage is applied to the whole analog circuitry 4, and, therefore, the analog circuitry 4 is placed in its operating state (Step S3).

The antenna circuit 42 in the analog circuitry 4 receives the radio wave 92 from the external device and converts it into the electrical signal $S_E$ for application to the modulator/demodulator circuit 41. The modulator/demodulator circuit 41 demodulates the electrical signal $S_E$ to generate a digital data signal $S_D$ representative of input data and applies it to the input/output control circuit 34 in the digital circuitry 3. The input/output control circuit 34 generates a data signal in response to the digital data signal $S_D$ and applies the data signal to the bus 5. The CPU 31 reads the data signal, executes a predetermined operation in accordance with the data signal, and sends a predetermined data signal, which is to be transmitted to the external device, to the input/output control circuit 34 via the bus 5. The input/output control circuit 34 converts the data signal into a digital signal $S_D'$ and applies it to the modulator/demodulator circuit 41. The modulator/demodulator circuit 41 modulates a carrier with the digital signal $S_D'$ to produce a modulated electrical signal $S_E'$, which is applied to the antenna circuit 42. The antenna circuit 42 converts the modulated electrical signal $S_E'$ into a radio wave 91 and transmits it to the external device. Thus, transfer of data from the non-contact IC card 20 to the external device and from the external device to the non-contact IC card 20 are carried out by the transmission and reception of the waves 91 and 92 (Step S4).

The CPU 31 makes a judgment as to whether the data transfer between the IC card 20 and the external device is being performed normally or not or whether data itself is correct or not (Step S5). If the judgment is YES. the CPU 31 performs predetermined processing (Step S6) and applies the result of the processing to the input/output control circuit 34. The input/output control circuit 34 applies the digital data signal $S_D'$ to the modulator/demodulator circuit 41, which, in turn, provides the modulated electrical signal $S_E'$ to the antenna circuit 42. The antenna circuit 42 sends data representative of the result of the processing to the external device in the form of the radio wave 91 (Step S7).

When a predetermined data transfer between the IC card 20 and the external device is completed, the CPU 31 sends a command to turn off the switching circuit 11 so as to inhibit the operating voltage $V_{cc}$ from being applied to the circuit portion of the analog circuitry 4, except the antenna circuit 42 and the trigger signal demodulating circuit 43, and, at the same time, the internal clock inhibit circuit 36 within the CPU 31 is turned off so as to inhibit the application of the clock signal to the internal circuits of the CPU 31, the ROM 32, RAM 33 and the input/output control circuit 34 (Step S8). Thus, the non-contact IC card 20 returns to its standby state.

If the judgment in the Step S5 is NO, i.e. if it is judged that there is something wrong in the data transfer, such as data being inappropriately transferred or inappropriate data being transferred, the CPU 31 performs error processing (Step S9), and the processing jumps directly to a Step 8 to turn off the internal clock inhibit circuit 36 within the CPU 31 so that the application of the clock signal to the various parts of the digital circuitry 3 is inhibited and, at the same time, the switching circuit 11 is also turned off to inhibit the application of the operating voltage to the circuit portion of the analog circuitry 4 except for the antenna circuit 42 and the trigger signal demodulating circuit 43.

Although the operating voltage $V_{cc}$ is being continuously applied to the digital circuitry, its power consumption is significantly reduced when the application of the clock signal thereto is inhibited, because, in a digital circuitry, a large current flows essentially at the rising and falling edges of a clock signal and, substantially no current flows when the application of the clock signal is inhibited and, therefore, there is no state change.

The IC card 20 has been described as coupled to the external device by means of radio waves, but the present invention can provide the same results if it is applied to an IC card which is coupled by a medium other than radio waves, such as light and ultrasonic waves.

The digital circuitry 3 and the analog circuitry 4 may be in the form of an LSI on the same chip or may be IC's on separate chips.

Furthermore, although in the described embodiment, the internal clock within the CPU 31 is inhibited when no data transfer is occurring between the IC card and the external device, the oscillator circuit 1 may be disabled instead. In this case, the oscillator circuit 1 is enabled by the trigger signal $S_T$ which is applied to the oscillator circuit 1 via a trigger line 60' indicated by a dotted line in FIGS. 2 and 3.

As described, according to the present invention, in the standby mode of operation of the non-contact IC card during which data transfer between the card and the external device is not occurring, (A) the application of the clock signal to various portions of the digital circuitry or (B) the application of the operating voltage to portions of the analog circuitry is inhibited, or (C) both the application of the clock signal and the application of the operating voltage are inhibited, the amount of power consumed in the standby mode is significantly reduced so that the life of the battery in the IC card is extended. In addition, since the operating voltage is continuously applied to the digital circuitry 3 even after the inhibition of any of the above-described (A), (B) and (C), there is no fear that the stored information in the CPU 31, the ROM 32 and the RAM 33 would be lost. Furthermore, when there is any abnormal condition in the data transfer between the IC card and the external device, the CPU 31 provides a command to prevent the non-contact IC card from wasting power.

What is claimed is:

1. A non-contact IC card comprising:
   an oscillator circuit for generating a clocking oscillation signal;
   digital circuitry, including at least a CPU, ROM, and RAM, said CPU receiving the clocking oscillation signal and producing an internal clock signal from the clocking oscillation signal, said ROM and RAM being operated in response to the internal clock signal;
   analog circuitry coupled to said digital circuitry for transmitting data to and receiving data from an external device without contacting the external device; and
   an internal power supply battery for providing an operating voltage to said oscillator circuit, said digital circuitry, and said analog circuitry wherein said CPU includes an internal clock inhibit circuit for inhibiting application of the internal clock signal to said ROM and RAM in response to a command produced by said CPU when said non-contact IC card is neither transmitting data to nor receiving data from an external device and for applying the internal clock signal to said digital circuitry in response to receipt of data by said analog circuitry from an external device.

2. A non-contact IC card according to claim 1 wherein said oscillator circuit continues to generate the clocking oscillation signal while application of the internal clock signal to said ROM and RAM is inhibited in response to a command produced by said CPU.

3. A non-contact IC card comprising:
   an oscillator circuit for generating a clocking oscillation signal;
   digital circuitry, including at least a CPU, ROM, and RAM, said CPU receiving the clocking oscillation signal and producing an internal clock signal from the clocking oscillation signal;
   analog circuitry coupled to said digital circuitry for transmitting data to and receiving data from an external device without contacting the external device; and
   an internal power supply battery for providing an operating voltage to said oscillator circuit, said digital circuitry, and said analog circuitry including a switching circuit for inhibiting application of the operating voltage from said battery to part of said analog circuitry in response to a command produced by said CPU when said non-contact IC card is neither transmitting data to nor receiving data from an external device and for applying the operating voltage to said analog circuitry in response to receipt of data by said analog circuitry from an external device.

4. A non-contact IC card comprising:

an oscillator circuit for generating a clocking oscillation signal;

digital circuitry, including at least a CPU, ROM, and RAM, said CPU receiving the clocking oscillation signal and producing an internal clock signal from the clocking oscillation signal, said ROM and RAM being operated in response to the internal clock signal;

analog circuitry coupled to said digital circuitry for transmitting data to and receiving data from an external device without contacting the external device;

an internal power supply battery for providing an operating voltage to said oscillator circuit, said digital circuitry, and said analog circuitry wherein said CPU includes an internal clock inhibit circuit for inhibiting application of the internal clock signal to said ROM and RAM in response to a command produced by said CPU when said non-contact IC card is neither transmitting data to nor receiving data from an external device and for applying the internal clock signal to said digital circuitry in response to receipt of data by said analog circuitry from an external device; and a switching circuit for inhibiting application of the operating voltage from said battery to part of said analog circuitry in response to a command produced by said CPU when said non-contact IC card is neither transmitting data to nor receiving data from an external device and for applying the operating voltage to said analog circuitry in response to receipt of data by said analog circuitry from an external device.

5. A non-contact IC card according to claim 4 wherein said analog circuitry includes an antenna circuit for transmitting data to and receiving data from an external device and a trigger signal demodulating circuit for generating a trigger signal for controlling said CPU wherein, when said non-contact IC card is neither transmitting data to nor receiving data from an external device, application of the operating voltage to said antenna circuit and to said trigger signal demodulating circuit continues and application of the operating voltage to said analog circuitry, excluding said antenna circuit and said trigger signal demodulating circuit, is inhibited.

6. A non-contact IC card according to claim 4 wherein, said oscillator circuit continues to generate the clocking oscillation signal while application of the internal clock signal to said ROM and RAM is inhibited in response to a command produced by said CPU.

* * * * *